United States Patent Office 3,014,935
Patented Dec. 26, 1961

3,014,935
5α-ESTRANE-3α,17β-DIOLS AND ESTERS THEREOF
Raymond E. Counsell, Skokie, Ill., assignor to G. D. Searle & Co., Chicago, Ill., a corporation of Delaware
No Drawing. Filed June 15, 1960, Ser. No. 36,115
7 Claims. (Cl. 260—397.5)

The present invention relates to 3,17-bis-oxygenated estranes optionally alkylated at the 17-position and, more particularly, to 5α-estrane-3α,17β-diols and esters thereof as represented by the structural formula

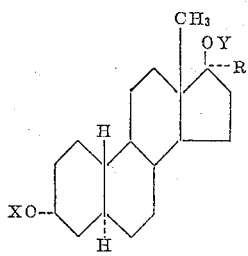

wherein R is hydrogen or a lower alkyl radical, and X and Y are members of the class consisting of hydrogen and lower alkanoyl radicals.

The lower alkyl radicals represented by R are, suitably, methyl, ethyl, propyl, butyl, pentyl, hexyl, and the branched-chain isomers thereof.

The term X encompasses lower alkanoyl radicals exemplified by formyl, acetyl, propionyl, butyryl, valeryl, caproyl, and the branched-chain isomers thereof, said groups being the acyl radicals of alkanoic acids containing fewer than 7 carbon atoms.

Starting material suitable for the preparation of the instant diols are the corresponding 17β-hydroxy-3-ones of the structural formula

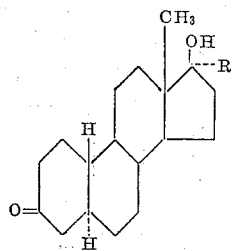

wherein R is hydrogen or a lower alkyl radical. Reduction of the 3-oxo group, suitably with Raney nickel, affords the instant 3α,17β-diols. As a typical example, 17β-hydroxy-17α-methyl-5α-estran-3-one in ethanol is treated with W–5 Raney nickel at the reflux temperature of the mixture. Removal of the catalyst by filtration and the solvent by evaporation yields the instant 17α-methyl-5α-estrane-3α,17β-diol.

The 3α,17β-di-(lower alkanoates) of this invention can be prepared by treatment of the corresponding diols with a lower alkanoic acid anhydride in pyridine. 5α-estrane-3α,17β-diol, for example, is heated at steam bath temperature with acetic anhydride and pyridine to afford 5α-estrane-3α,17β-diol diacetate. A particularly suitable method of preparation of the 17α-alkyl-3α,17β-di-(lower alkanoates) of this invention involves reaction of the parent diols with the appropriate isopropenyl alkanoate in the presence of a suitable acidic catalyst such as p-toluenesulfonic acid. The aforementioned 17α-methyl-5α-estrane-3α,17β-diol, for example, upon treatment with isopropenyl acetate in the presence of a catalytic quantity of p-toluenesulfonic acid yields 17α-methyl-5α-estrane-3α,-17β-diol diacetate.

The instant 17β-mono-alkanoates of 5α-estrane-3α,17β-diol can be prepared by reduction of the corresponding 17β-alkanoyloxy-5α-estran-3-ones with the aforementioned W–5 Raney nickel catalyst. As a specific example, an ethanolic solution of 17β-acetoxy-5α-estran-3-one is heated at reflux with W–5 Raney nickel catalyst to produce 17β-acetoxy-5α-estran-3α-ol. On the other hand, reduction of 3α-alkanoyloxy-5α-estran-17-ones with lithium tri-(tertiary butoxy) aluminum hydride affords the instant 3α-alkanoyloxy-5α-estran-17β-ols. A typical example of this process involves the reaction of 3α-acetoxy-5α-estran-17-one in tetrahydrofuran with lithium tri-(tertiary butoxy) aluminum hydride to yield 3α-acetoxy-5α-estran-17β-ol.

Partial hydrolysis of the aforementioned 17α-(lower alkyl)-5α-estrane-3α,17β-diol di-(lower alkanoates), suitably in an alkaline medium, affords the corresponding 17β-mono-(lower alkanoates). Treatment of 17α-methyl-5α-estrane-3α,17β-diol diacetate, for example, with an aqueous solution of potassium carbonate in methanol results in 17β-acetoxy-17α-methyl-5α-estran-3α-ol.

The instant 3α-(lower alkanoyl)oxy-17α-(lower alkyl)-5α-estran-17β-ols can be manufactured by relatively short contact of the parent diols with a lower alkanoic acid anhydride in pyridine. Typically, the aforementioned 17α-methyl-5α-estrane-3α,17β-diol is heated with acetic anhydride and pyridine for about 30 minutes to yield 3α-acetoxy-17α-methyl-5α-estran-17β-ol.

The compounds of this invention are useful as a result of their valuable pharmacological properties. In particular, they are potent estrogen antagonists as evidenced by their ability to inhibit the characteristic sexual changes accompanying the administration of estrogens. In addition, they are anabolic and androgenic agents.

The following examples are given by way of illustration only and are not to be construed as limiting the invention in spirit or in scope. Temperatures are given in degrees centigrade (° C.), and quantities of materials in parts by weight unless otherwise noted.

*Example 1*

To a solution of 4 parts of 17β-hydroxy-5α-estran-3-one in 240 parts of ethanol is added 10 parts of W–5 Raney nickel catalyst, and the mixture is heated at reflux for about 2 hours. The catalyst is removed by filtration, washed with ethanol, and the filtrate is concentrated to dryness. A benzene solution of the residue is submitted to chromatography on silica gel, and the column is eluted with 15% ethyl acetate in benzene. Evaporation of the solvents yields 5α-estrane-3α,17β-diol, M.P. 191.5–193°; [α]$_D$=+31.5° (chloroform). This substance is characterized by infrared absorption maxima at about 2.74, 2.88, 3.42, 6.9, 8.0, 9.4, and 9.56 microns.

*Example 2*

A solution of 4 parts of 17β-hydroxy-17α-methyl-5α-estran-3-one in 240 parts of ethanol is mixed with 10 parts of W–5 Raney nickel catalyst, then heated at reflux for about 2 hours. Removal of the catalyst by filtration affords a solution, which is evaporated to dryness. Adsorption of the resulting residue on a silica gel chromatographic column followed by elution with 15% ethyl acetate in benzene results in 17α-methyl-5α-estrane-3α,17β-diol, M.P. 184–187°; [α]$_D$=+6° (chloroform). This substance displays infrared maxima at about 2.74, 3.4, 6.98, 7.27, 9.36, 10.28, and 10.72 microns.

*Example 3*

A mixture of one part of 17α-ethyl-17β-hydroxy-5α-estran-3-one, 80 parts of ethanol, and 2.5 parts of W–5 Raney nickel is heated at reflux for about 4 hours, then cooled and filtered to remove the catalyst. The filtrate is concentrated to dryness, and the resulting residue is adsorbed on silica gel, then eluted with 10% ethyl acetate in benzene to afford 17α-ethyl-5α-estrane-3α,17β-diol, M.P. 186–186.5°; [α]_D=+13° (chloroform). This diol exhibits maxima in the infrared at about 2.74, 3.4, 6.9, 7.25, 9.37, and 10.3 microns.

*Example 4*

A mixture of 4 parts of 5α-estrane-3α,17β-diol, 10 parts of acetic anhydride, and 90 parts of pyridine is heated on the steam bath for about 2 hours, during which time homogeneity is achieved, then allowed to stand at room temperature for about 15 hours. The reaction mixture is poured slowly into ice and water, and the resulting precipitate is collected by filtration, then washed with water to yield 5α-estrane-3α,17β-diol diacetate. Recrystallization from ethanol results in needle-like crystals, M.P. 142–143.5°; [α]_D=+24° (chloroform). Infrared maxima are observed at about 3.42, 5.78, 6.9, 7.29, 7.92, 9.6, and 9.75 microns.

*Example 5*

A mixture of 2 parts of 17β-acetoxy-5α-estran-3-one, 150 parts of ethanol, and 5 parts of W-5 Raney nickel catalyst is heated at reflux for about 2 hours. The catalyst is removed by filtration of the cooled reaction mixture, and the filtrate is concentrated to dryness. The resulting residue is adsorbed on a silica gel chromatographic column, then eluted with 5% ethyl acetate in benzene to afford 17β-acetoxy-5α-estran-3α-ol, M.P. 166–167°; [α]_D=+18° (chloroform). Its infrared absorption spectrum displays maxima at about 2.72, 3.4, 5.77, 6.89, 7.26, 7.90, 9.57, and 9.72 microns.

The substitution of an equivalent quantity of 17β-propionoxy-5α-estran-3-one in the process of this example results in 17β-propionoxy-5α-estran-3α-ol.

*Example 6*

A mixture of 5 parts of 17α-methyl-5α-estrane-3α,17β-diol, 10 parts of acetic anhydride, and 100 parts of pyridine is heated at 90–100° for about 30 minutes, then cooled and poured slowly into a mixture of ice and water. The resulting precipitate is collected by filtration and recrystallized from aqueous ethanol to afford 3α-acetoxy-17α-methyl-5α-estran-17β-ol.

*Example 7*

To a solution of one part of 17α-methyl-5α-estrane-3α,17β-diol in 20 parts of isopropenyl acetate is added 0.15 part of p-toluenesulfonic acid monohydrate, and this mixture is heated gently for about 7 hours, during which time the acetone formed is allowed to distil. The reaction mixture is cooled and diluted with about 70 parts of ether, then washed successively with water, aqueous sodium bicarbonate solution, and water. The organic solution is dried and decolorized over a mixture of anhydrous potassium carbonate and activated carbon, and the solvent is removed to afford a yellow oil, which solidifies on standing. Recrystallization from aqueous ethanol results in 17α-methyl-5α-estrane-3α,17β-diol diacetate.

By substituting an equivalent quantity of isopropenylpropionate in the process of this example, 17α-methyl-5α-estrane-3α,17β-diol dipropionate is obtained.

*Example 8*

To a solution of one part of 17α-methyl-5α-estrane-3α,17β-diol diacetate in 20 parts of methanol and 2.5 parts of water is added 0.5 part of potassium carbonate, and the resulting mixture is heated at reflux for about one hour. This reaction mixture is cooled, neutralized with acetic acid, and concentrated at reduced pressure to about one-third of its original volume. The residual mixture is diluted with ether and washed with water, then dried over anhydrous potassium carbonate. Removal of the solvent followed by crystallization of the resulting oily residue from aqueous ethanol yields 17β-acetoxy-17α-methyl-5α-estran-3α-ol.

*Example 9*

A mixture of one part of 3α-acetoxy-5α-estran-17-one, 20 parts of tetrahydrofuran, and 2 parts of lithium tri-(tertiary butoxy) aluminum hydride is allowed to stand at room temperature for about 2 hours, then poured slowly into 5% aqueous acetic acid. The resulting precipitate is collected by filtration, washed on the filter with water, and recrystallized from aqueous ethanol to yield 3α-acetoxy-5α-estran-17β-ol.

*Example 10*

By substituting an equivalent quantity of propionic anhydride for acetic anhydride in the processes of Examples 4 and 6, 5α-estrane-3α,17β-diol dipropionate and 17α-methyl-3α-propionoxy-5α-estran-17β-ol, respectively, are obtained.

What is claimed is:

1. A compound of the structural formula

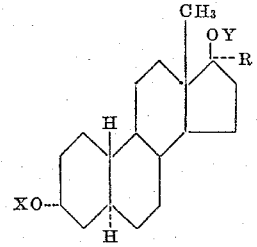

wherein R is selected from the group consisting of hydrogen and lower alkyl radicals, and X and Y are selected from the group consisting of hydrogen and lower alkanoyl radicals.

2. A compound of the structural formula

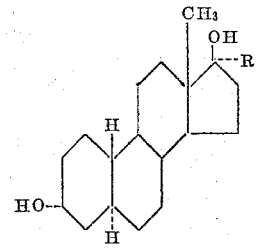

wherein R is a lower alkyl radical.

3. 5α-estrane-3α,17β-diol.
4. 17α-methyl-5α-estrane-3α,17β-diol.
5. 17α-ethyl-5α-estrane-3α,17β-diol.
6. 17β-acetoxy-5α-estran-3α-ol.
7. 5α-estrane-3α,17β-diol diacetate.

References Cited in the file of this patent

Salamon: Hel. Chim. Acta, vol. 32, No. 4 (1949), pages 1306–1314 (pages 1307-8 relied on).

Dorfman et al.: Androgens, John Wiley & Sons, Inc., New York (1956), pages 497–498.

Bowers et al.: J. Am. Chem. Soc., vol. 79 (1957), pages 4556–7.

Rapala et al.: J. Org. Chem., vol. 23 (1958), pages 1404–5.